United States Patent [19]

Kawai et al.

[11] Patent Number: 5,375,017
[45] Date of Patent: Dec. 20, 1994

[54] APPARATUS FOR DUPLICATION OF BIT-PATTERN ON RECORDING MEDIUM

[75] Inventors: Ayumu Kawai, Osaka; Saburo Iwano, Tokyo, both of Japan

[73] Assignee: Ed-Contrive & Co., Ltd., Ibaraki, Japan

[21] Appl. No.: 202,661

[22] Filed: Feb. 25, 1994

Related U.S. Application Data

[63] Continuation of Ser. No. 424,761, Oct. 20, 1989, abandoned.

[51] Int. Cl.$^5$ .................. G11B 5/86; G11B 15/12; G11B 5/09
[52] U.S. Cl. ............................... 360/15; 360/61; 360/53
[58] Field of Search ................ 360/13, 15, 27, 48, 360/53, 61, 60; 369/83, 84

[56] References Cited

U.S. PATENT DOCUMENTS

| | | | |
|---|---|---|---|
| 4,375,655 | 3/1983 | Korth et al. | 360/15 |
| 9,725,899 | 2/1988 | Gardner | 360/15 |

*Primary Examiner*—Donald T. Hajec
*Assistant Examiner*—Won Tae C. Kim
*Attorney, Agent, or Firm*—Darby & Darby

[57] ABSTRACT

In accordance with the duplication of bit-patterns on a recording medium of the present invention, presence of gaps as defined by one or more words of predetermined code in data is judged, then with having these gaps as the write-succession points, and placing an unwritable bit-pattern in these respective gaps, data is written in onto the recording medium of the transfer-destination. Thus, the write-succession points can be determined, and the occurrence of bit-shift can be avoided. In addition, transmission of data on the recording media over a long distance become possible.

4 Claims, 5 Drawing Sheets

APPARATUS FOR DUPLICATION OF BIT-PATTERN ON RECORDING MEDIUM

This is a continuation, of application Ser. No. 07/424,761, filed Oct. 20, 1989, now abandoned.

FIELD OF THE INVENTION AND RELATED ART STATEMENT

1. Field of the Invention

The present invention related to duplication, or transfer, of data from one recording medium to another.

2. Description of the Prior Art

The duplication of data on recording media in the prior art is a method of file transfer. Here, a file means an ensemble of information collected systematically for a certain particular purpose, that is, it is a form of data management. And the method of data transfer is that data on a recording medium is read by a reading head, the data thus read out is converted into form of a file in accordance with the form of the relevant system, then the data converted into this file form is transferred to a certain transfer-destination, and in this transfer-destination the data is again converted reversely and written in on a recording medium at the transfer-destination.

In the duplication method by the above mentioned file transfer method, however, there have been the following difficulties.

1. It is difficult or not possible to communicate between different types of computers. That is, in case any difference in the types of computers or in the types of file drives were present, communication therebetween is not possible due to the difference in their corresponding file configurations.

2. Communications are not possible when any difference in types of operating systems (hereinafter, abbreviated as OS) or types of formats are present. That is, a particular file transfer method prepared to a particular OS or a particular format cannot be applied to different types of OS's or formats since the conversion scheme into data in the form of file is of totally different form that of original OS or format. And even between the same OS, the file format can be different depending on the types of computers. In such case also, communications are not possible.

3. For the operation involved, normally an operator or operators who are working on the system are necessary. This meant that the following processes must be carried out by an operator or operators; that is, aftely the operator analyzes the concept and the configuration of files on a recording medium, the operator searches of the file to be found on the recording medium, stores the contents of the file in a memory means, and transfers it to a destination.

4. It is not possible to communicate programs of different computers (particularly in the case where the programs are types of system programs).

In order to solve the above-mentioned problems, it is desirable to employ a method that does not rely on the file transfer method.

The basic idea of the method mentioned above is to transfer the entirety of the data on a floppy disk (FD), for example, including data such as pictures, characters, or graphics, without being limited by any concept or format of the relevant disk. The transfer is done by operating the system as if it is a facsimile for paper documents. As for the method to accomplish the above, hitherto, a floppy disk controller (FDC) has been used.

Use of the floppy disc controller, however, is not able to totally improve all of the problems mentioned above. That is, the floppy disc controller could transfer only that data on a floppy disk whose formats were known by the FDC beforehand. Whereas, they could not read data with an unknown format nor data including protect codes. Then, methods where all of the bits (0 or 1 signal) were transferred were tried, but they also actually had the following problems, obstacles against their complete actual usage:

1. Difficulty in location of write-succession points

When data is recorded on an FD, it is difficult to locate the points at which a head of a floppy disk drive (FDD) starts to land on or depart from the FD.

2. Occurrence of bit-shifts

When data is recorded on an FD, bit-shifts occur at the write-succession points at which records start or end. This makes the verification of written data difficult.

OBJECT AND SUMMARY OF THE INVENTION

The purpose of the present invention is to provide duplication of bit-patterns on recording media in a manner which is highly reliable, fast, rational, and also permits the data to be transmittable over a long distance.

The invention utilizes a recording medium duplication apparatus comprising:

A read-out means which reads out data (codes of 0 and 1) of a length of one track from a recording medium of transfer-dispatcher, A memory means in which the read out data is stored, A judging means which judges the presence of gaps (segments of a particular code) in the above-mentioned recorded data, and A write-in means which writes in the above-mentioned data stored in the above-mentioned memory means onto a recording medium at a transfer-destination.

In carrying on the invention the data is read in again starting from the above-mentioned gap judged by the above-mentioned judging means and is stored in the above-mentioned memory means.

An unwritable bit-pattern (mark) (can be read out but cannot be written) by a recording medium controller (abbreviated hereinafter as FDC) is placed in the above-mentioned gap.

The data is written in on the recording medium at the transfer-destination with placing the above-mentioned gap at the head (beginning) of the data track or record to be transferred.

Also, the written-in data can be transmitted out.

A data recording medium is also disclosed. The invention is accomplished by a read-out means which reads out successively data (codes of 0 and 1) of a length of one track from a recording medium of a transfer-dispatcher, a recording medium control means floppy disc controller (FDC), which selectively does or does not (able or unable) input the read out data into a write-in means, a judging means which judges whether the above-mentioned recording medium controller (FDC) can input the read out data into the write-in means, an input change-over means which, in accordance with the judgment issued by the above-mentioned judging means for judging whether the input to the above-mentioned write-in means is able or unable, changes over the input of the read out data into the above-mentioned recording medium controller when the input is able or into a data memory means when the input is unable, a memory means which memorizes the data input from the above-mentioned input change-over means, a judging means which judges the presence of gaps in the above-mentioned recorded data, and a write-in means which writes in the above-mentioned data memorized in the above-mentioned memory means, or the data which is input from the above-mentioned recording medium controller, onto a recording medium of a transfer-designation.

In the preferred embodiment of the invention, the production of an input-able control signal issued from the above-mentioned judging means, which judges whether the above-mentioned recording medium controller can input the read out data into the data write-in means or not, causes the data input from the above-mentioned recording medium control means to be written in onto the recording medium of the transfer-destination.

In accordance with the issuance of an input-unable control signal from the above-mentioned judging means which judges whether the above-mentioned recording medium controller can input the read out data into the data write-in means or not, the data read out by the above-mentioned input change-over means is input into the above-mentioned memory means.

Also, the data read out again is memorized in the memory means by placing the above-mentioned gap judged by the above-mentioned gap judging means at the head of the data record.

Further, an unwritable bit-pattern (mark) (can be read out but cannot be written in) by a recording medium controller is placed in the above-mentioned gap.

The data is written in on the recording medium of the transfer-destination by placing the above-mentioned gap at the head of the data record.

In addition the read out can be transmitted out.

In these drawings, numeral 3 designates a read-out means, 5 designates a judging means, 7 a memory means, 8 is an unwritable bit-pattern replacement circuit, 9 designates a write-in means, 21 designates an FDC circuit change-over circuit, and 22 designates an FDC circuit.

DETAILED DESCRIPTION OF THE PREFERRED EMBODIMENTS

Figure 1:
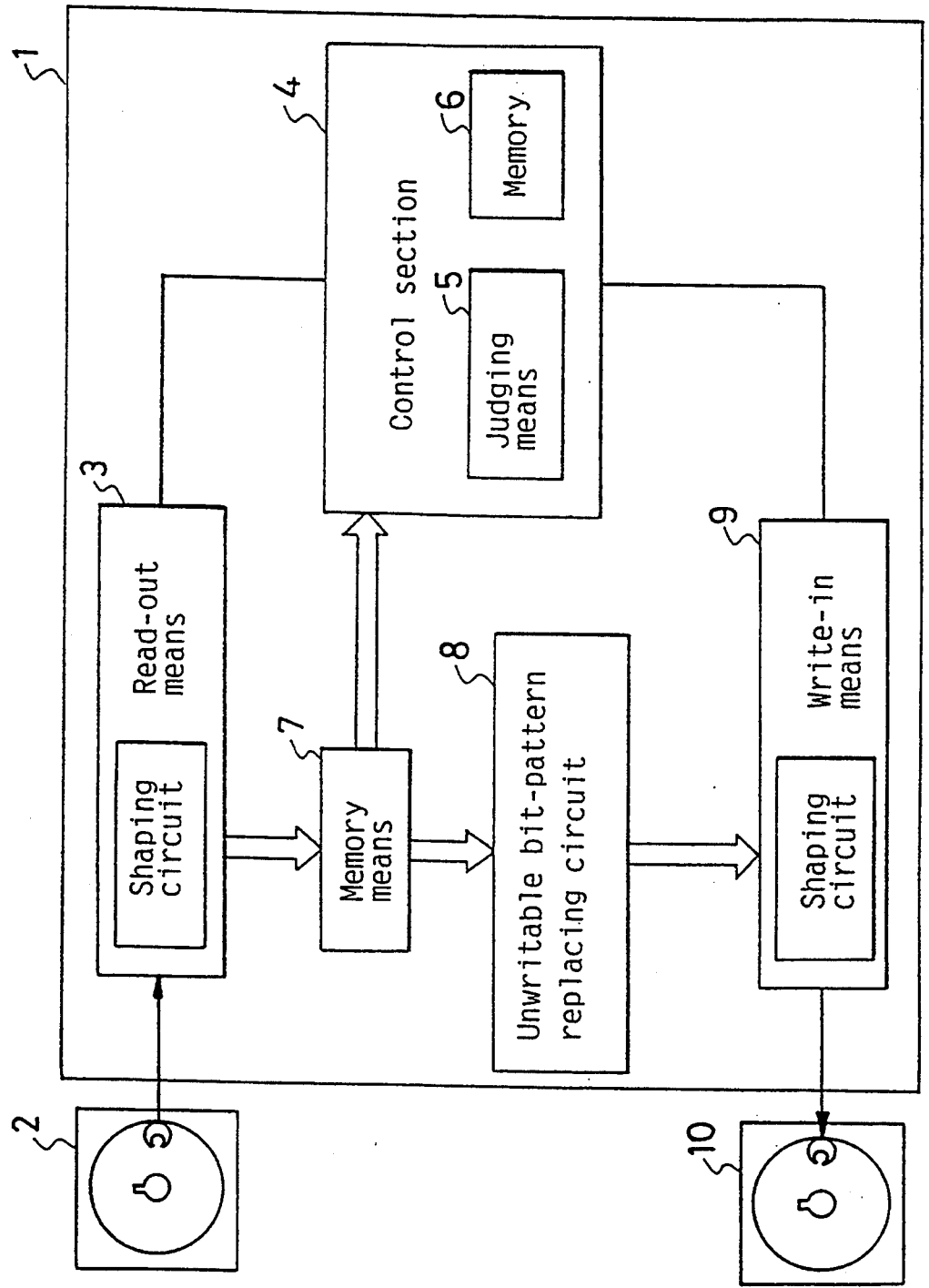
FIG. 1 is a block diagram of a system used in a preferred embodiment of the present invention.

FIG. 1 is a block diagram showing a system for a floppy disk duplication apparatus used in an embodiment of the present invention. In FIG. 1 data in one track on a floppy disk 2, which is a transfer-dispatcher, is read out by a read-out means 3, comprised of a magnetic head, a driving circuit driving the head, and a shaping circuit. The read out data is memorized (stored) in a memory means 7. The data stored in memory 7 is judged by a judging means 5 of a control section 4. The control section 4 comprised of a microprocessor which performs judging described later in accordance with a control program which is written in control section memory 6. The above-mentioned data in one track is re-memorized through the read-out means into the memory means 7. The data in the memory means 7 is sent to an unwritable bit-pattern replacing circuit 8, and is written in on a floppy disk 10 at the transfer-destination by a write-in means 9 (comprised of a magnetic head, a driving circuit driving the head, and a shaping circuit).

Figure 2:
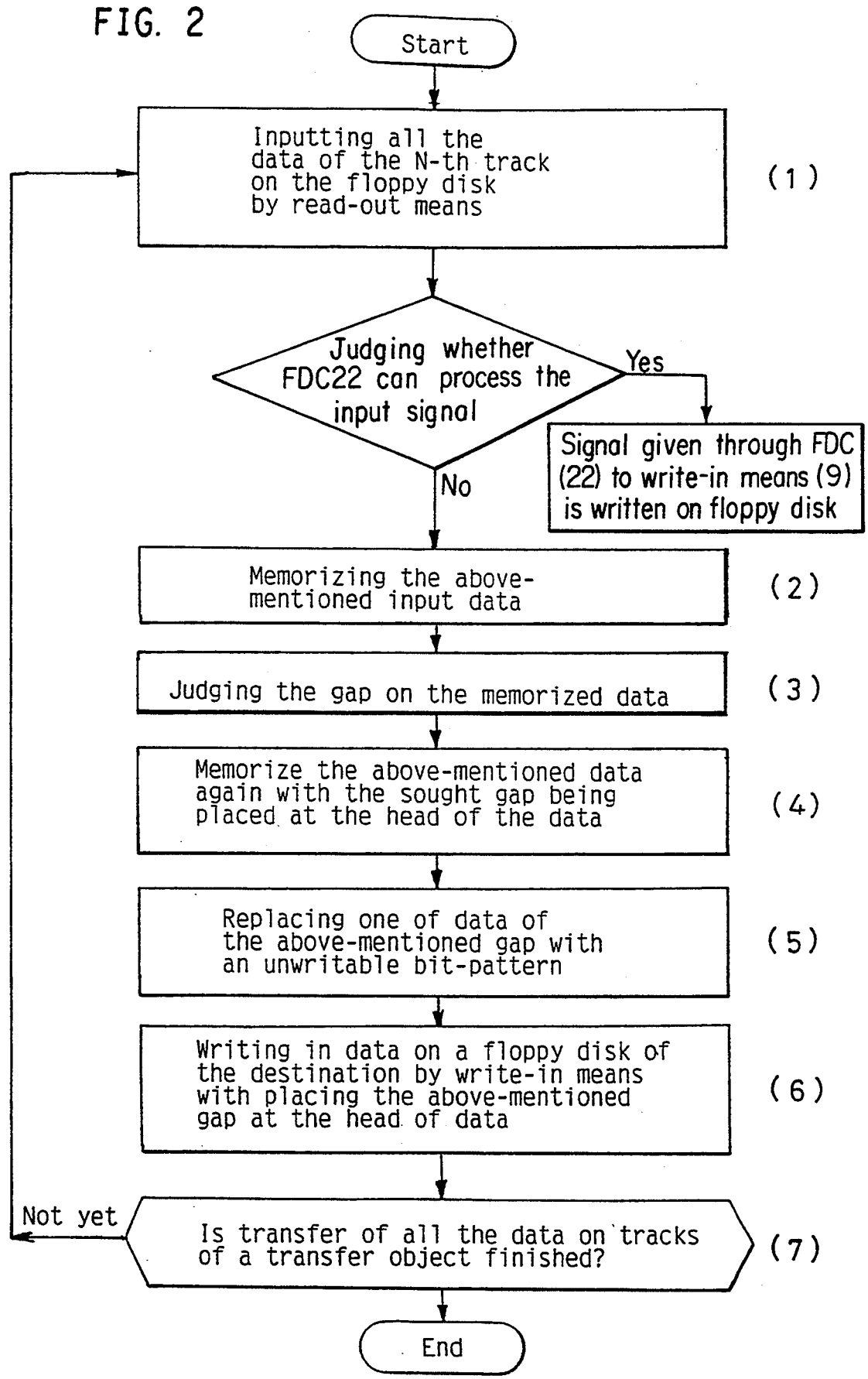
FIG. 2 is a flow chart showing the action of the controller section.

The contents of the control operation of the control section 4 is explained according to the flow chart of FIG. 2. First, all the data of the N-th track on the floppy disk is input (step 1). Then, this data is memorized in the memory means (step 2) and gaps on the memorized data are judged (step 3). A gap is defined as a part in one data track wherein no useful data is recorded and certain particular codes are packed, for example, on a double density floppy disk, gaps are those parts where one or a number of bits of code words having a bit pattern representing the hexadecimal number 4E is packed. Then after placing the above-mentioned gap thus detected at the head of the record, the data mentioned above is read out again by the read-out means and is memorized or stored, again in a memory means (step 4).

Since the data in the gap has no particular meaning, even if bit-shift occurs, an inconvenient error effect does not take place. Thus for the purpose of placing the write-succession point at the gap, one of data in the above-mentioned gap is replaced with an unwritable bit-pattern (in the FDC, replacing with an unwritable bit-pattern such as 1000100100001) (step 5). By placing the gap at the head of the data record, the data is written in on the floppy disc 10 at the transfer-destination by the write-in means 9 (comprised of a magnetic head, a driving circuit driving the head, and a shaping circuit) (step 6).

The steps from step 1 to step 6 are repeated until the transfer of all the data on tracks of a transfer object is finished (step 7).

Figure 3:
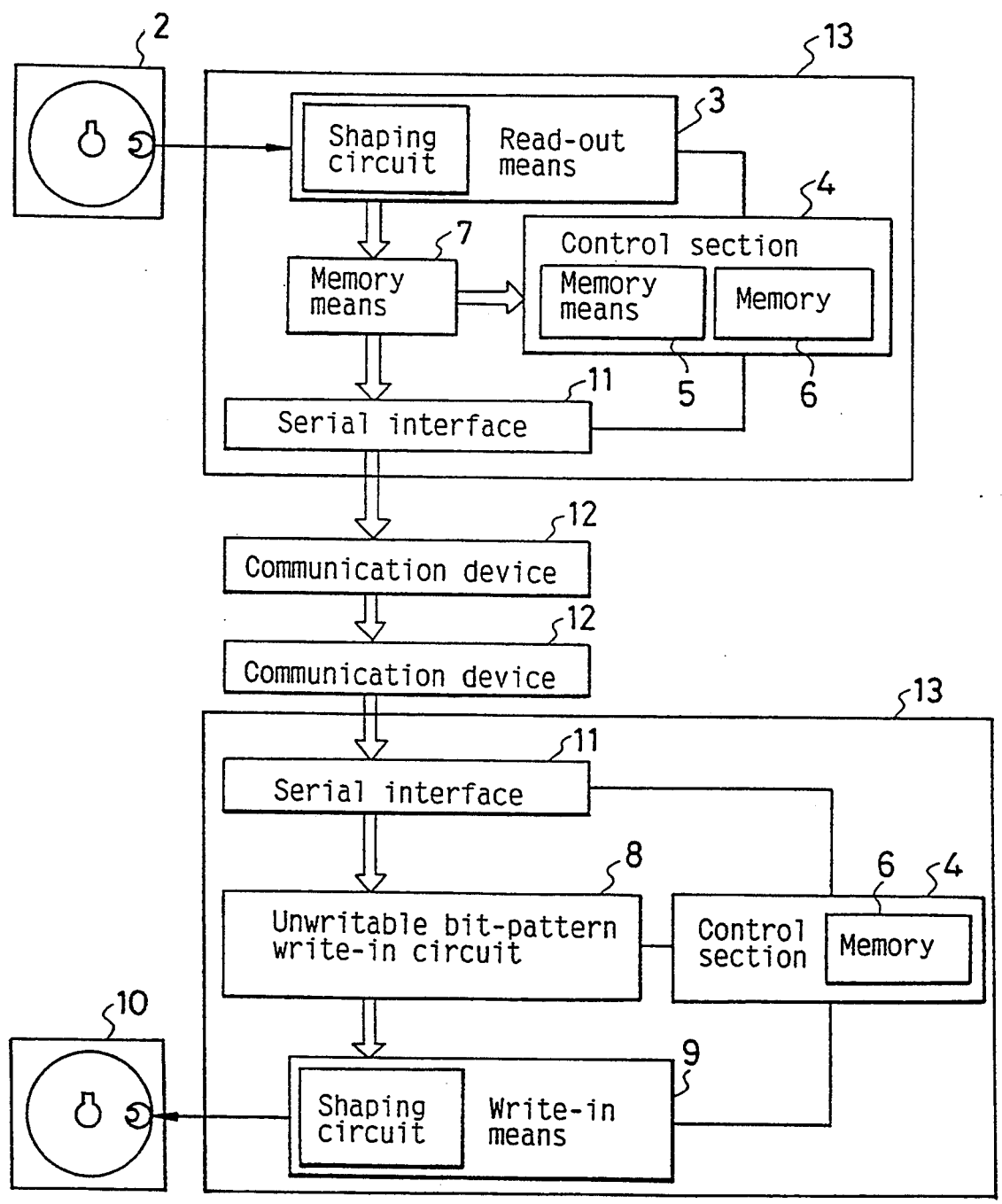
FIG. 3, FIG. 4 and FIG. 5 are block diagrams showing electrical systems used respectively in other embodiments of the present invention.

In the above-mentioned embodiment, explanation has been given of an example in which the data is input into the write-in means 9 from the memory means 7 directly through the unwritable bit-pattern replacing circuit 8. This example corresponds to an apparatus such as a floppy disk duplication apparatus. In FIG. 3, another embodiment is shown. In the embodiment of FIG. 3, next to the memory means 7, a serial interface 11 and a communication device 12 are provided. For example, in a telephone line, data is dispatched first through a modem and transmitted through a public telephone traffic network and is conveyed to a distant transfer apparatus 13. Thus, the data is received through a communication device 12 and a serial interface 11 of the transfer apparatus 13 on the receiver side and then is input through an unwritable bit-pattern write-in circuit 8 into a write-in means 7. Then the data written in the write-in means 7 is written into a floppy disk at the transfer-destination. The above-mentioned apparatus is a floppy disk duplication means at a remote location. That is, it may be called as a floppy disk data transfer apparatus.

Figure 4:
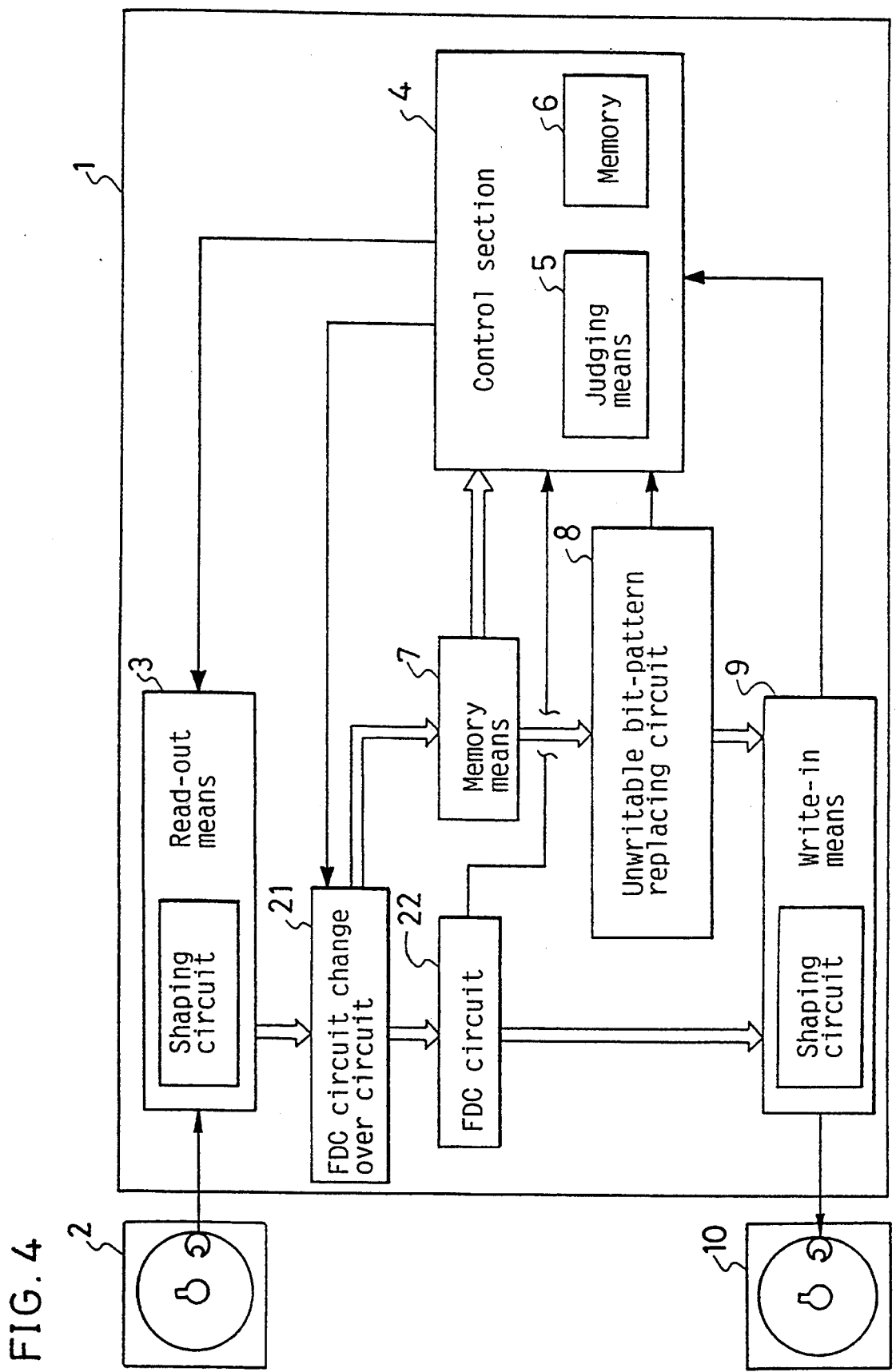

In the above-described embodiment, examples of only a floppy disk duplication method in accordance with which the present invention is used has been described. In FIG. 4, however, another embodiment is shown, In the embodiment of FIG. 4, an FDC (floppy disk controller) circuit change over circuit 21 is provided just after the read-out means 3. In this embodiment, data is first treated by a conventional FDC circuit 22. The data is such that it can by processed by the FDC circuit 22. Data is written in the write-in means 9 without performing any additional process, and transferred to a floppy disk 10 of the transfer-destination. In case that the data is not of the type that can be processed by the FDC circuit 22, the circuit connection is changed over by the FDC circuit change over circuit 21, and the data is processed by all those circuits explained in the embodiment 1 described above. By using this circuit, the data that is processible by the FDC circuit 22 can be processed still faster by the FDC circuit 22, and only the data that is not processible is processed by the circuit described before, thereby it becomes possible that the processing speed is made faster.

Figure 5:
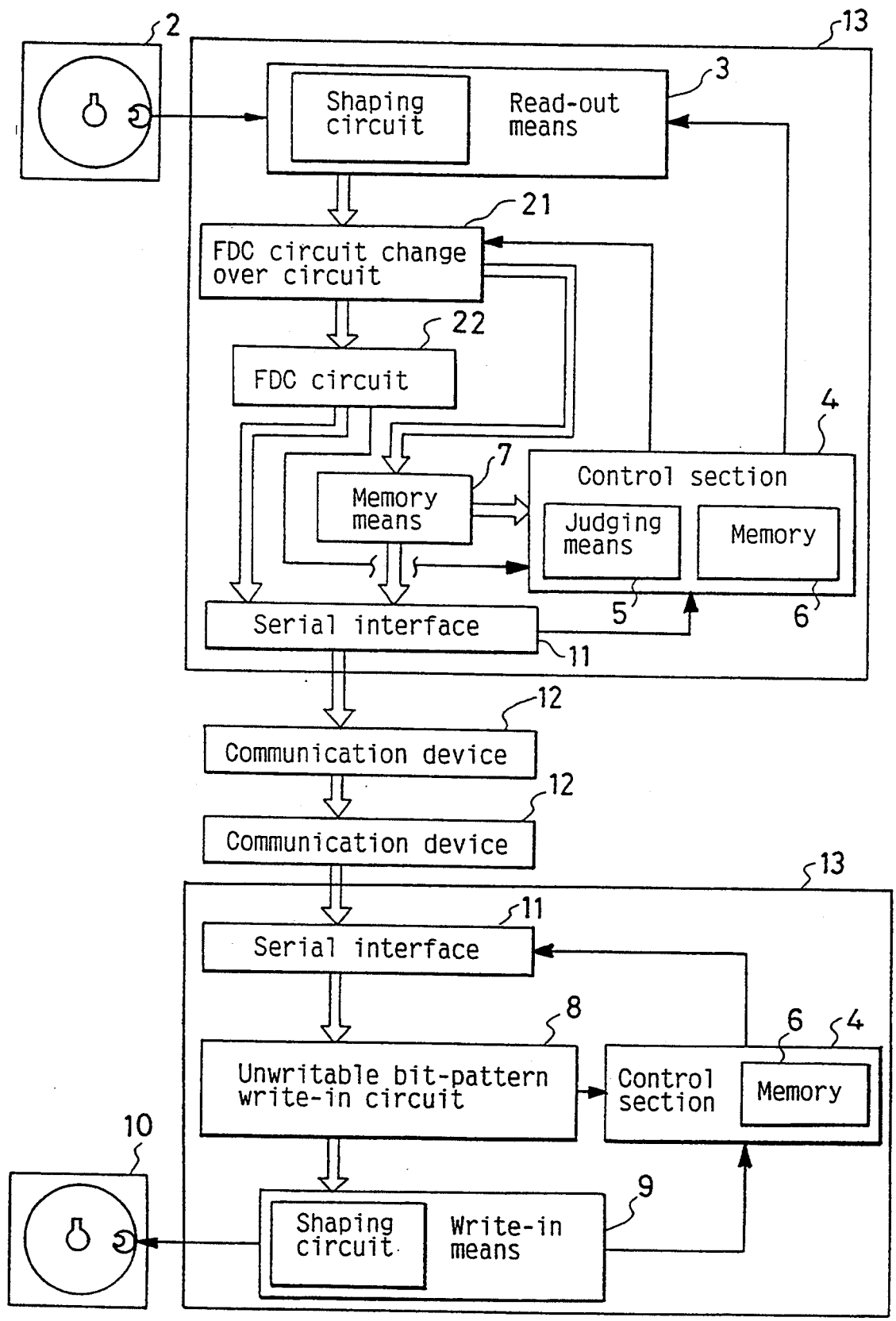

And, as an example of combinations of the embodiments described above, an embodiment, which is a combination of the embodiment of the floppy disk transfer apparatus of FIG. 3 and the embodiment of the floppy disk composite apparatus including the FDC circuit of FIG. 4, is shown in FIG. 5. This embodiment is considered to be the most suitable as a practical apparatus used for actual applications. Its operation is the same as that of the embodiments of FIG. 3 and FIG. 4.

Although in the above embodiments the write-in means and the read-out means were explained as two separate elements, it should be understood that, in an actual apparatus, those two means are accomplished by a single element playing those two roles. That is, one magnetic head serves both functions of read out and writing.

Also, although in the above embodiments, only such examples that gaps were utilized as the parts wherein any meaningful data were not recorded in respective data tracks, it is needless to mention that those parts such as "sync" signals can also be used instead of gaps in the above embodiments.

What is claimed is:

1. Apparatus for transfer of binary bit-pattern data stored on a recording medium at a transfer dispatcher to a recording medium at a transfer-destination comprising:
    means for reading out one track of data of a particular length from the data stored on the recording medium at the transfer-dispatcher,
    memory means for storing said read out one-track of data,
    means for reading out said stored one-track of data from said memory means and means for judging the presence in said one-track of data read out from said memory means of gap code data,
    means for re-storing in said memory means said one-track of data read out from the recording medium at said transfer dispatcher, the re-storing of said one-track of data starting from said gap code data as judged by said judging means,
    means for replacing a part of said gap code data of the restored one-track data with a pattern of bits which can be read out by, but cannot be written over by, a recording medium controller, and
    means for writing in on a recording medium at the transfer-destination said re-stored one-track of data from said memory means with said pattern of bits at the head of the data written in.

2. Apparatus as in claim 1 further comprising means for transmitting the re-stored data read out from said memory means to a recording medium at a distant location.

3. Apparatus for transfer of binary bit-pattern data stored on a recording medium at a transfer-dispatcher to a recording medium at a transfer-destination comprising:
    read-out means for reading out one-track of data of a particular length from the recording medium at the transfer-dispatcher;
    a recording medium controller circuit for receiving the data read out by said read-out means;
    judging means for judging whether said one-track of data can be processed by said recording medium controller circuit;
    change over means for selecting one of first and second output-destinations, said change over means forwarding the data read out by said read-out means to said recording medium controller circuit as the first output-destination when a result of a judgment of said judging means is a first value, said change over means forwarding the data read out by said read-out means to a second output-destination when a result of a judgment of said judging means is a second value, said second output-destination including memory means for storing said one-track of data;
    means for reading out said one-track of data from said memory means and judging the presence of gap code data in said one track of data read out from said memory means;
    means for re-storing in said memory means said one-track of data read out from the recording medium at said transfer-dispatcher, the re-storing of said one-track data starting from said gap code data as judged by said judging means;
    means for replacing a part of said gap code data of the re-stored one-track of data with a pattern of bits which can be read out, but cannot be written over, by a recording medium controller; and
    means for writing on said recording medium at the transfer-destination one of said data processed by said recording medium controller circuit or said re-stored one-track of data from said memory means with said pattern of bits at the head of the data written in.

4. Apparatus as in claim 3 further comprising means for transmitting the data processed by said processing medium controller and said re-stored one track of data to a remote location.

* * * * *

UNITED STATES PATENT AND TRADEMARK OFFICE
CERTIFICATE OF CORRECTION

PATENT NO. : 5,375,017

DATED : December 20, 1994

INVENTOR(S) : A. Kawai and S. Iwano

It is certified that error appears in the above-identified patent and that said Letters Patent is hereby corrected as shown below:

On the title page:
Item [73], change "Ibaraki" to --Osaka-Fu--.

Signed and Sealed this

Twenty-third Day of May, 1995

Attest:

Attesting Officer

BRUCE LEHMAN

Commissioner of Patents and Trademarks